(12) United States Patent
Petersen et al.

(10) Patent No.: US 6,615,323 B1
(45) Date of Patent: Sep. 2, 2003

(54) OPTIMIZING PIPELINED SNOOP PROCESSING

(76) Inventors: Thomas Albert Petersen, 8302 Spicewood Springs Cove, Austin, TX (US) 78759; Jose Melanio Nunez, 12107 Black Angus Dr., Austin, TX (US) 78727; Marie Jeannette Sullivan, 15315 English River Loop, Leander, TX (US) 78641

( * ) Notice: Subject to any disclaimer, the term of this patent is extended or adjusted under 35 U.S.C. 154(b) by 0 days.

(21) Appl. No.: 09/389,445

(22) Filed: Sep. 2, 1999

(51) Int. Cl.⁷ .............................................. G06F 13/42
(52) U.S. Cl. ........................................................ 711/146
(58) Field of Search ................................. 711/141, 146

(56) References Cited

U.S. PATENT DOCUMENTS

| | | | |
|---|---|---|---|
| 5,341,487 A | 8/1994 | Derwin et al. | 395/425 |
| 5,659,710 A | 8/1997 | Sherman et al. | 395/473 |
| 5,774,700 A | 6/1998 | Fisch et al. | 395/555 |
| 6,192,453 B1 * | 2/2001 | Arimilli et al. | 711/146 |

* cited by examiner

Primary Examiner—Jack A. Lane

(57) ABSTRACT

A system and method are provided for maintaining cache coherency in symmetric multiprocessor system by having logic for performing snoop queries separate from logic for performing snoop actions. This logic split permits increased throughput because pending snoop queries must no longer wait until snoop actions complete. Two state machines are disclosed: a pipeline state machine for snoop queries; and a snoop action state machine, for executing the split logic handling snoop requests.

16 Claims, 4 Drawing Sheets

OPTIMIZING PIPELINED SNOOP PROCESSING

TECHNICAL FIELD

The present invention relates to high-performance multiprocessor memory subsystems, and more particularly to maintaining cache coherency on multiprocessors using a snoopy protocol.

BACKGROUND OF THE INVENTION

Symmetric multiprocessing systems include multiple processing elements connected to main memory via an interface. Each processing element may contain one or more levels of cache—fast memory close to the central processing unit. A cache contains copies of memory data in blocks, typically 32 or 64 bytes. Each cache block can contain an exact copy of the main memory data, or newer data if the processor has performed stores to the block. Only one processing element may contain, i.e. own data which is different from main memory. To enforce this rule of the cache coherency, each cache block contains state information.

In the MESI protocol, a cache block may be in one of four states:

INVALID—the block is not resident in the cache;
SHARED—the block is resident in the cache and contains the latest data, which is the same data as main memory, but other processing elements may also have copies,
EXCLUSIVE—the block is resident in the cache and contains the latest data, which is the same data as main memory, and no other processing element has a copy, or
MODIFIED—the block is resident in the cache and contains the latest data, which may be newer than that in the main memory.

If a processing element performs a load to a block marked Invalid in its cache, it must perform a load request to main memory. If a processing element performs a store to a block marked Shared or Invalid in its cache, it must perform a store request to main memory. In the case of a block marked Shared, the store request to main memory is not to read the data, since it already has a copy of the latest data, but to claim ownership of the block, i.e. set the state to Modified, and ensure that no other processing element retains a stale copy of data. In other words, a block otherwise valid is stale if it does not contain the latest data.

If a processing element performs a store to a block marked Exclusive, the processing element may mark the block Modified without performing a bus request.

Exclusive implies no other processing element has a copy of the data. Loads to blocks marked Shared, Exclusive, or Modified, or stores to blocks marked Modified, may also be performed without a bus request, and do not change the MESI state of the block.

In a snoopy protocol, every time a processing element requires a copy of data not already resident in its cache, it performs a request to main memory. For a system with one interface to main memory, all processing elements are connected to the same request bus, and can 'see' all requests from other processing elements. The process for capturing requests from other processor elements off the request bus, looking up the state of the block of memory in one's own cache (s), and responding with state information is called a snoop. Typically, each processing element performing a snoop must respond with its state or a retry signal within a fixed number of bus cycles.

In a system using the MESI protocol, a processing element which has a block in the Shared or Exclusive state will respond to a read request from another processing element with a shared signal. This signal prompts the processing element performing the read request to set the state of the block in its own cache to Shared instead of Exclusive—marking that the block may have multiple copies on multiple processing elements. In turn, the snooping processing element will change a block in its cache marked Exclusive to Shared when it snoops a read request from another processing element.

If the snooped request is a store instead of a read, the snooping processing element must change the state of its cache block to Invalid, since the type of request store implies that the requesting processor wants to set the state of the block to Modified in its cache, and the MESI protocol prohibits multiple copies of a block marked Modified.

A processing element which has a block in the Modified state must signal with a modified or retry response that main memory cannot service the request with its data if that processing element snoops a read or a store to that block. That processing element must then provide the data to the requesting processor and/or main memory and change its own state to Shared if the request was a read or to Invalid if the request was a store.

This process of providing modified data and then changing cache state is typically a more complicated process and takes longer than simply changing state from Exclusive or Shared to Shared or Invalid. Since a block in the Shared or Exclusive state is merely a copy of main memory data, the state of the block can be downgraded from Exclusive to Shared or Invalid, or Shared to Invalid speculatively (without knowing all the responses to the request) without violating coherency. Changing Modified state requires ensuring that there is somewhere for the data to go, since it is the only valid copy in the system.

Another example of a state change which cannot be performed speculatively involves semaphores. Systems which implement semaphores using load-and-reserve and store-conditional instruction pairs typically have a hardware reservation holding the address of the load-and-reserve instruction. The store-conditional instruction can 'succeed' and modify data only if the processing element still has a valid reservation at the time it gains ownership of the block and sets the state of the block Modified. This coherency rule is typically enforced in a snoopy system by invalidating reservations upon snooping a store request on the bus. Since two processing elements may be vying to perform a store-conditional on the same block, it is preferable to invalidate a reservation on a snoop only if the snoop is successful (not retried) on the bus. Only if the store is not retried does it gain ownership of the block.

The state lookup, and state changes which are performed speculatively as part of the lookup, is called the snoop query. The state changes which may not be performed speculatively, or which require many cycles to perform, are called the snoop action. In real-world systems, the percentage of snoop queries that trigger snoop actions is small.

Previous high-performance multiprocessors typically included two or more snoop state machines. Each state machine could handle a snoop query and any snoop action resulting from that snoop query. Since the logic to handle all the cache state transitions and snoop actions is complicated, such an arrangement results in a large duplication of logic to handle the infrequent case, snoop action, as well as adding complexity to arbitrate between multiple state machines.

Further, new memory requests requiring new snoop queries may occur while the response and/or action of a previous snoop is pending. Since all snoop queries require a snoop state machine to look up cache state, if multiple snoops require snoop actions, and fill up the available state machines, all subsequent snoops including those which do not need snoop actions would be retried for lack of snoop resources until one of the pending snoop actions completed.

Various approaches, all somewhat complex, to improving throughput in cache coherency system appear in the prior art. Commonly assigned U.S. Pat. No. 5,659,710 to Sherman, et al., describes a cache coherency system employing serially encoded snoop responses. Commonly assigned U.S. Pat. No. 5,341,487 to Derwin, et al., discloses a memory system in which snoop cycles are pipelined. U.S. Pat. No. 5,774,700 to Fisch, et al., discloses a method and apparatus for determining the timing of snoop windows in a pipelined bus.

It is desirable in view of the complexity of prior art techniques to further simplify snoop handling for supporting a pipelined snoop response.

SUMMARY OF THE INVENTION

The present invention overcomes the shortcomings of the prior art by providing a method and system for maintaining cache coherency in a multiprocessor environment employing a snoop protocol. The present invention splits the logic which performs a snoop query from that which performs a snoop action. The snoop query logic performs the cache state lookup and speculative state changes. The snoop action logic handles any actions which cannot be performed speculatively (e.g. reading data from an off-chip cache).

The snoop query logic is implemented as a pipeline state machine which takes n cycles. In these n cycles, the state of the cache(s) is examined and the response calculated. The length of the pipeline is set by the fixed response time on the bus and the time required to access the cache state. Ideally the length of the pipeline is also matched to the maximum frequency of new bus requests (1 every n or more cycles), so only one snoop query could be active at a time. An example is a bus that runs no faster than a 2:1 bus ratio with respect to the processor, and which allows a new address tenure every other bus clock. This system would fit naturally with a snoop query pipeline 4 cycles long.

The snoop action is a state machine to handle all actions which cannot be performed during the snoop query pass. This includes reading of modified data from the caches, and changing of cache state which cannot be performed speculatively. The snoop query state machine 'hands off' a snoop request if the calculated response indicates that further action is required. At this point, the snoop query pipeline is ready to handle a new snoop even if there are pending actions. Only if a new snoop requires an action and an action is pending for a previous snoop does the need for retry requests arise. The snoop action state machine performs all required actions including rearbitrating for cache access to read data and/or change state. When all required actions are complete, then snoop action state machine goes idle and is ready to accept a new hand-off from the snoop query state machine.

Note that with one simple pipeline (for queries) and one state machine (for actions) most snoop traffic may be handled without retries. Even if a processing element snoops a request which requires an action and must retry it because there is a pending action, there is no need to retry subsequent requests which do not require actions. For systems with a high proportion of snoop actions, or for which actions may be especially slow to complete, this method may be extended with multiple snoop action state machines, keeping the simplicity of the single snoop query pipeline.

As used in this description, speculative actions which may be performed by the snoop query logic include any state change which does not change architectural state or which can be undone.

State changes which do not change architectural state and can be performed speculatively include changing an exclusive line to shared, or changing an exclusive or shared line to invalid. Changing a modified line to invalid, shared, or exclusive does change architectural state if the data is not forwarded to memory or a new owner. Logic may be provided to undo the architectural change in event of a retry by, for example, converting the data intended for servicing a cache-to-cache transfer into a castout.

Invalidating a reservation associated with a load-and-reserve/store-conditional semaphore instruction pair may not be done speculatively. If the reservation were invalidated but the request that caused the invalidation were retried, it is possible that all reservations for a semaphore would be invalidated without any of the competing semaphores succeeding, preventing forward progress by the software.

Table 1 shows sample speculative actions and sample non-speculative actions. For purposes of clarity, speculative actions are indicated as Type 1 and non-speculative action requests are designated Type 2.

TABLE 1

| Type 1 Request | Type 2 Request |
| --- | --- |
| Read, snooper cache state I, S, E | Read, snooper cache State M |
| Store, no modified data or reservation | Store, snooper has valid reservation |

BRIEF DESCRIPTION OF THE DRAWINGS

The above-noted features and advantages of the invention will best be understood from the following detailed description of a preferred embodiment when taken in conjunction with the accompanying drawings, wherein.

DETAILED DESCRIPTION OF A PREFERRED EMBODIMENT

Figure 1:
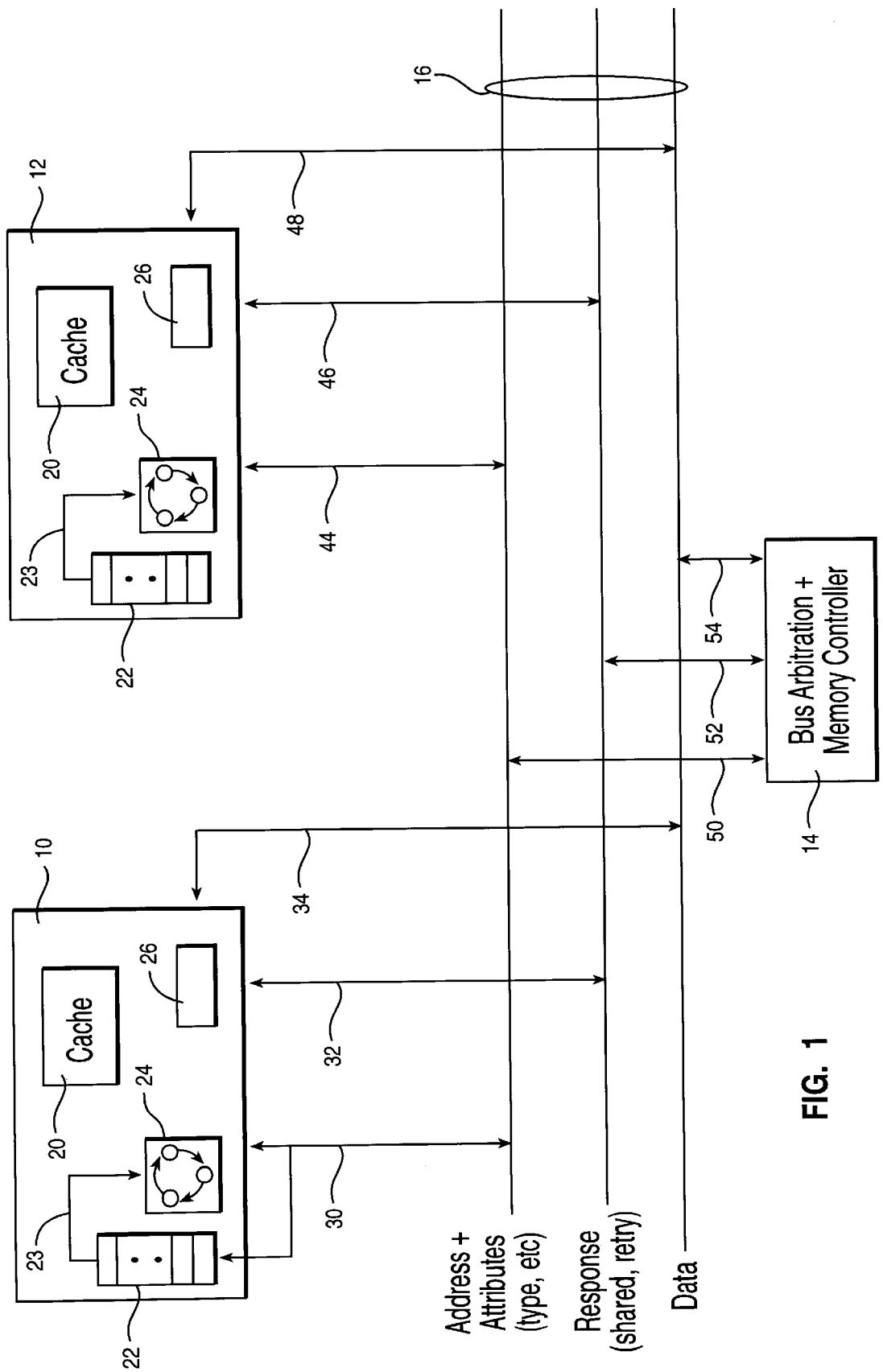
FIG. 1 is a block diagram of a multiprocessors computing system in which the present invention is embodied.

Refer now to FIG. 1, which is a simplified block diagram of a cache coherent system for multiple processors utilizing shared address bus with snoopy protocol. In the figure, two of a plurality of processing elements 10 and 12 are shown interconnected to bus arbitration and memory controller 14 via multiline bus 16. Processing elements 10 and 12 may be Power PC processing elements available from International Business Machines Corporation.

Processing element 10 includes a cache 20, a snoop query pipeline 22 with an associated snoop action state machine 24. Processing element 10 additionally includes bus request logic 26. Bus request logic 26 handles access to lines 30 and 40 of bus 16 via separate point-to-point control signals to and from processing element 10 and bus arbitration logic 14.

Processing element 10 is connected to the address and attributes line of bus 16 via line 30, which also has an input to snoop query pipeline. Line 30 is provided for supplying an address and various attributes of signals of snoops appearing on bus 16. Line 32 is provided for interconnecting processing element 10 with the response line of bus 16 and line 34 is the connection between processing element 10 and the data line of bus 16.

Processing element 12 includes a cache 20, snoop query pipeline 22, snoop action state machine 24, and bus request logic 26 in a manner similar to processing element 10. Processing element 12 is connected to the address and attributes line of bus 16 via line 44, to the response line of bus 16 via line 46 and to the data line of bus 16 via line 48. Bus arbitration and memory controller 14 is connected to the address and attributes line of bus 16 via line 50, to the response line of bus 16 via line 52 and to the data line of bus 16 via line 54.

Conventional elements in a multiprocessor system employing a snoopy bus protocol, including cache arbitration logic, address collision logic and cache lookup logic are not shown. Those having skill in the art will understand that the above noted and other system elements are present and function in a conventional manner. That is, cache arbitration logic and collision logic are interconnected between address and attributes line 30 of bus 16, which has an input to snoop query pipeline 22, and cache 20 in the processing elements, 10 and 12, shown, of the plurality of processing elements sharing bus 16.

Figure 2A:
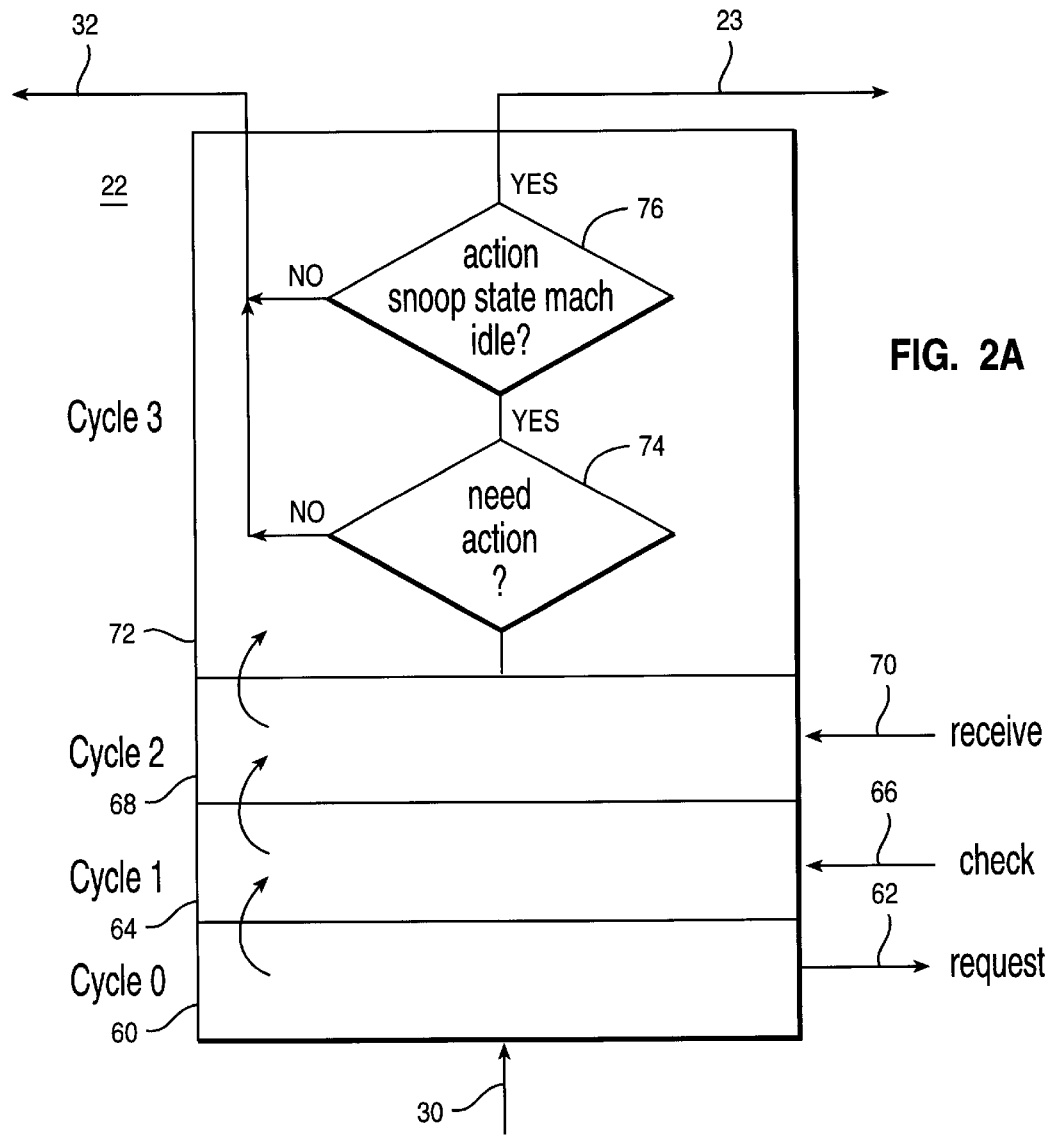
FIG. 2a shows in more detail snoop query pipeline 22 of FIG. 1.
Figure 2B:
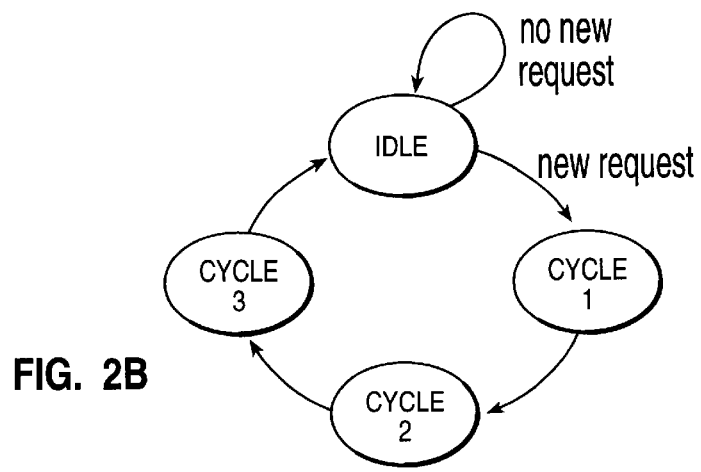
FIG. 2b illustrates a state machine equivalent to snoop query pipeline 22, FIG. 1.

Refer now to FIG. 2A and FIG. 2B which together illustrate the snoop query pipeline of the present invention.

A snoop query pipeline 22 from FIG. 1 is shown in greater detail in FIG. 2A. FIG. 2A illustrates a four-state machine where there is only one transition choice present, and that is in the idle state. Only when a new request is received does a state transition occur. A first input to snoop query pipeline 22 is on line 30, the address and attributes line of bus 16 in FIG. 1. In the first cycle, cycle 0, indicated by reference numeral 60, pipeline 22 issues a request on line 62 to look up caches. The request to look up caches is sent to cache arbitration logic (not shown) and forwarded from there to cache 20. At cycle 1, shown at 64, address collision(s) check result is received over line 66 from a plurality of address and attribute registers throughout cache 20 and memory control logic (not shown) of processing element 10. Cycle 2, indicated at 68, is when pipeline 22 receives cache states information as represented by line 70. Cache states are sent directly from cache 20 to snoop query logic, pipeline 22.

In the fourth stage 72 of the pipeline, at clock cycle 3, pipeline 22 at decision block 74 determines whether any actions are required as a result of the snoop request. If yes, pipeline 22 then checks at decision block 76 whether the snoop action machine (24, FIG. 1) is idle and, if so, sends via line 23 the snoop request to snoop action state machine 24.

If, however, no action was required as determined at decision block 74, a signal is placed on line 32 to send a response back to the response line of bus 16. If it is determined at decision block 76 that the snoop action state machine is busy, then a retry signal is placed on line 32 and sent to the response line of bus 16.

Since the snoop query logic is implemented as a pipeline state machine, FIG. 2B is provided to illustrate the states of the pipeline snoop query. At cycle 0, the idle state is maintained until such time as a new request is received at cycle 1. At cycle 2, the cache states are received, and at cycle 3, the logic shown in FIG. 2A is executed and the snoop query state machine returns to the idle state until such time as a new request appears on the bus address and attributes line 30.

Figure 3:
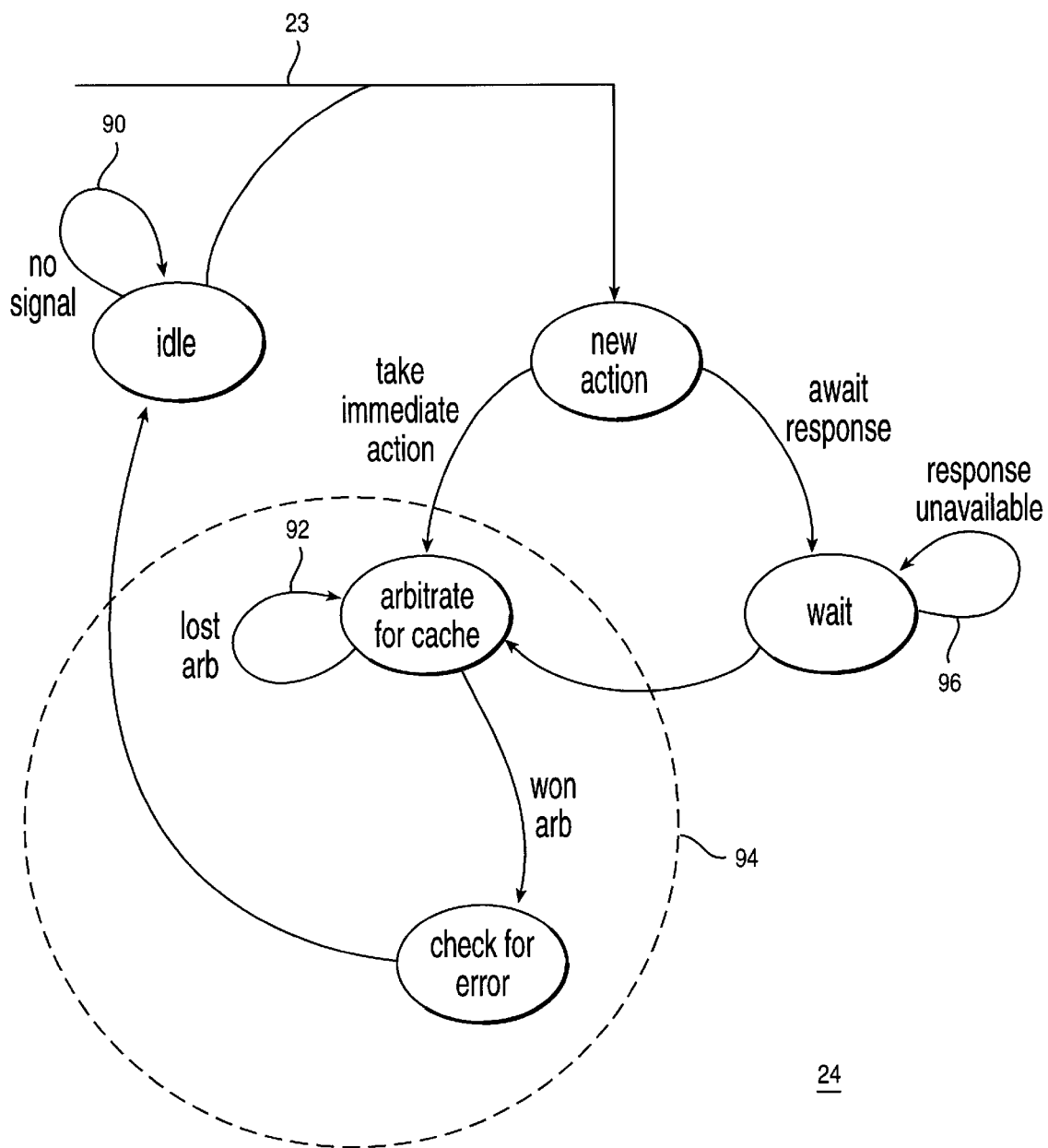
FIG. 3 illustrates an exemplary snoop action state machine.

Refer now to FIG. 3, which is a more detailed depiction of a snoop action state machine 24 of FIG. 1. A signal on line 23 represents that the snoop query logic has determined that a non-speculative action is required. Snoop action state machine 24 remains in the idle state as shown by the arrow 90 until such time as a new action is received on line 23 from the snoop query logic shown in FIG. 2. The idle state of snoop action state machine 24 changes once a new snoop action is received. If the required action may be done immediately, i.e., is speculative, the state changes to one of engaging in arbitration for a cache and that state continues as indicated by the arrow 92 until such time as arbitration is successful, at which time the state changes from cache arbitration to states to perform whatever action(s) or error check state. Because several actions are possible, FIG. 3 contains a dotted line 94 to indicate that whatever action is required gets performed. The actual states are, of course, implementation dependent.

If the new action means that snoop action state machine 24 must first await a response, the state machine transitions to a wait state in which it remains, as indicated by arrow 96, until such time as the response becomes available and the transition is made from the wait state to one of engaging in arbitration for a cache. Once arbitration is successful, the machine transitions from cache arbitration to state(s) for performing action(s), as above noted. Required actions are performed before snoop action state machine 24 returns to the idle state where it remains until such time as a new request appears on line 23.

Other actions which may be performed by snoop action state machine 24 include:

waiting for a bus response, and, if it is not retry, initiating an internal transaction to invalidate a reservation.

waiting for a bus response, and, if it is not retry, initiating a cache read to service a cache-to-cache transfer. If the response is retry, initiating a cache read to perform a castout to memory waiting for a bus response, and, if it is not retry, initiating a cache state change from modified to exclusive, shares, or invalid without reading the data.

Snoop action state machine 24 may perform several actions simultaneously, such as when a snooping processing element contains a line modified in the L1 and L2 caches, and a valid reservation. Upon snooping a store request, a snoop action will be created which will (if the store is not retried on the bus) invalidate the reservation, read the L1 data to service a cache-to-cache transfer, and invalidate the line in the L2 without reading the data.

Figure 4:
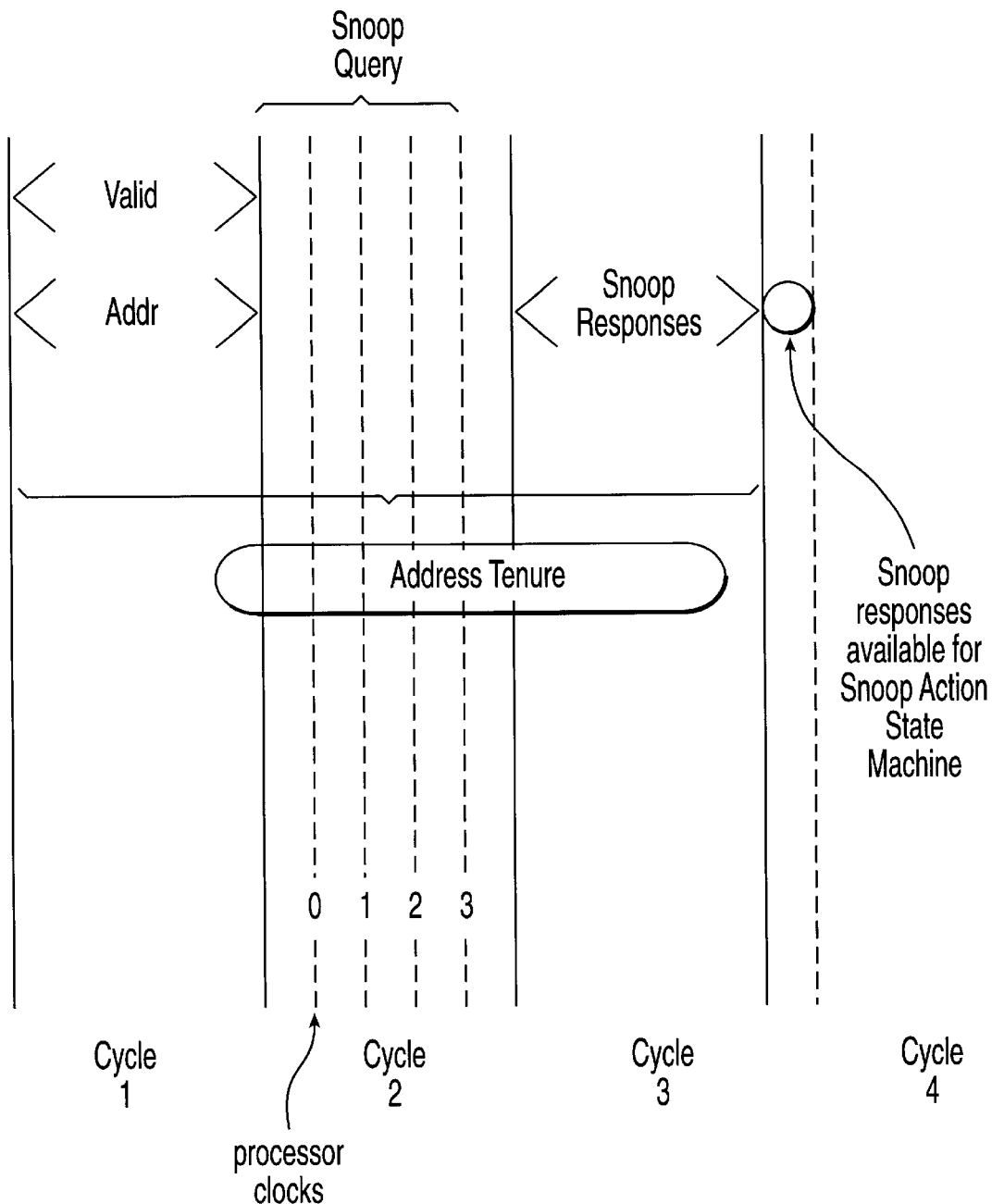
FIG. 4 depicts a timing chart useful in understanding the operation of the present invention.

FIG. 4 is an integrated timing diagram of the split logic implemented in accordance with the present invention for handling snoop queries and actions associated with the snoop queries. FIG. 4 assumes an exemplary processor running at 5:1 relative to the bus for (16, FIG. 1). For the four cycles (cycle φ, cycle 1, cycle 2 and cycle 3) illustrated in FIG. 4, address tenure with snoop query and snoop response window are shown. In cycle 1, the first cycle, a valid request, address and associated attributes are driven to the whole cycle on bus 16 via lines 30 or 44 (FIG. 1). Cycle 2 shows the four processor clock lines, corresponding to cycles φ-3 of FIG. 2A, during which the snoop query was handled in accordance with the logic described in connection with FIG. 2A. In the third cycle, the snoop responses occur and in a portion of the fourth cycle, the snoop responses are available to be handled by the snoop action state machine described in connection with FIG. 3.

While the present invention has been described in a preferred embodiment using MESI cache state protocol, those having skill in the art will understand that the principles of the invention apply to any cache state protocol including MSI, MOESI, MERSI, used with a snoopy bus protocol. Further, those having skill in the art will appreciate that if new bus requests occur more frequently than every n cycles, then the snoop query pipeline of the present invention may be modified to support multiple snoop queries in different stages of the pipeline simultaneously with some modest addition in address logic. Those skilled in the art will see that there are other implementation-dependent functions that could be performed by a snoop action state machine, in accordance with the teachings of the present invention. One example is the ordering of snoop action-generated transactions with other requests in a pipeline by stalling the arbitration request of a snoop action.

Those skilled in the art will appreciate that the above and other modifications in form and detail may be made without departing from the spirit and scope of the present invention.

What is claimed is:

1. A system for maintaining cache coherency in a data processing system, including a plurality of processing elements interconnected via a multiline bus with each other and with a bus arbitration and memory controller and having a memory subsystem employing a snoopy protocol, comprising:

a first, pipelined, state machine for handling snoop requests, said pipelined state machine including means for performing cache state lookup and means for initiating speculative state changes; and a second state machine for implementing logic for handling actions which cannot be performed by said first state machine.

2. The system of claim 1 wherein said first pipelined state machine additionally includes:

means for determining whether a snoop query requires a non-speculative action and, if so, handing off said snoop request to said second state machine.

3. The system of claim 2 wherein said snoop queries requiring non-speculative action include reading modified data and initiating cache state changes.

4. The system of claim 3 additionally including means for:

means for retrying requests for action which occur during pendency of a previous snoop request requiring non-speculative action.

5. The system of claim 4 wherein said second state machine includes:

means for performing all required actions including rearbitrating for cache access to read data and changing cache state.

6. The system of claim 5 wherein said second state machine additionally includes:

means for entering an idle state when all required actions are complete.

7. In a multiprocessor information handling system having a memory subsystem employing a snoopy protocol a method for maintaining cache coherency comprising:

capturing a snoop request;

providing a first, pipelined state machine for handling snoop requests requiring only cache state lookup and speculative state changes;

providing a second state machine for handling actions which cannot be performed speculatively;

determining whether said snoop request requires a non-speculative state change and passing said request to said second state machine; and placing said second state machine in an idle state when no non-speculative action is pending.

8. The method of claim 7 including the additional step of:

retrying a snoop request for non-speculative action while processing of a prior snoop request for non-speculative action is pending.

9. The method of claim 8 in which said determining step is performed by said state machine.

10. The method of claim 9 wherein said determining step includes:

retaining for processing in said first state machine a snoop request requiring an action from a group comprised of reading data in a cache having Exclusive, Shared or Invalid state and storing unmodified data without a reservation; and passing a snoop request requiring an action from a group comprised of reading Modified data and storing data with a valid reservation.

11. A cache coherency system for a memory subsystem of a multiprocessor information handling system comprising:

a first pipelined state machine including means for capturing a snoop request appearing on a bus;

a first pipeline state machine;

a second state machine;

said first state machine including
- means for capturing a snoop request,
- means for determining whether a captured snoop request requires a speculative or non-speculative action,
- means for performing a speculative action; and
- means for passing a snoop request requiring a non-speculative action to said second state machine;

said second state machine including
- means for receiving a snoop request requiring a non-speculative action, and
- means for performing said non-speculative action.

12. A cache coherency system for reducing retries in a memory subsystem of a multiprocessor information handling system, having at least two processing elements, a bus arbitration and memory controller and a bus employing a snoopy protocol interconnecting the processing elements and bus arbitration and memory controller, comprising:

- a pipelined snoop query state machine for examining a snoop request and determining to which of two types it belongs;
- a snoop action state machine;
- said snoop query state machine having means for processing requests of a first type; and
- means for transferring requests of a second type to said snoop action state machine; and
- said snoop action state machine having means for processing requests of said second type.

13. The system of claim 12 wherein said snoop action state machine additionally includes:

- means for issuing a retry when a request of type two is received during pendency of processing a prior request of type two.

14. The system of claim 13 wherein said snoop action state machine includes:

- means for entering an idle state when no new request of type two is pending.

15. The system of claim 12 wherein requests of type one include:

- reading data from a snooping processing element cache in Invalid, Shared, or Exclusive state and storing unmodified data without a reservation.

16. The system of claim 12 wherein requests of type two include:

- reading data from a snooping processing element cache in Modified state and storing data with a valid reservation.

* * * * *